United States Patent
Chen et al.

(10) Patent No.: US 11,258,381 B1
(45) Date of Patent: Feb. 22, 2022

(54) DRIVING CIRCUIT FOR SINGLE PHASE MOTOR AND DRIVING METHOD FOR THE SAME

(71) Applicant: ANPEC ELECTRONICS CORPORATION, Hsinchu (TW)

(72) Inventors: Kun-Min Chen, Hsinchu (TW); Ching-Shan Lu, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/143,117

(22) Filed: Jan. 6, 2021

(30) Foreign Application Priority Data

Oct. 16, 2020 (TW) .................................. 109135836

(51) Int. Cl.
| | |
|---|---|
| *H02P 6/16* | (2016.01) |
| *H02P 6/26* | (2016.01) |
| *H02K 29/12* | (2006.01) |
| *H02K 29/08* | (2006.01) |

(52) U.S. Cl.
CPC .............. *H02P 6/16* (2013.01); *H02K 29/08* (2013.01); *H02P 6/26* (2016.02)

(58) Field of Classification Search
CPC ...... H02P 6/28; H02P 6/16; H02P 6/26; H02P 6/085; H02K 29/12
See application file for complete search history.

(56) References Cited

U.S. PATENT DOCUMENTS

| | | | | |
|---|---|---|---|---|
| 7,486,041 | B2 * | 2/2009 | Wasson | G04C 3/143 |
| | | | | 318/432 |
| 9,774,283 | B2 * | 9/2017 | Chen | H02P 6/16 |
| 10,186,993 | B2 * | 1/2019 | Chen | H02P 6/16 |
| 2010/0253265 | A1 * | 10/2010 | Clothier | H02P 29/026 |
| | | | | 318/400.14 |
| 2018/0331639 | A1 * | 11/2018 | Aizawa | H02P 6/153 |

\* cited by examiner

*Primary Examiner* — Thai T Dinh
(74) *Attorney, Agent, or Firm* — Li & Cai Intellectual Property Office

(57) ABSTRACT

A motor driving circuit for a single phase motor and a motor driving method for the same are provided. The motor driving circuit includes a motor driver, a Hall sensor, a Hall commutation detection circuit, a period recording circuit, a motor current detection circuit, a cut-off angle adjustment circuit, an angle calculation circuit and a control circuit. The motor current detection circuit detects a motor current value at a commutation point after the single phase motor operates normally. The cut-off angle adjustment circuit generates a cut-off angle adjustment signal indicating a cut-off adjustment angle according to the motor current value when the single phase motor passes the commutation point. The control circuit processes the commutation signal and the cut-off signal generated by the angle calculation circuit to generate a control signal group to control the motor driver to generate an output signal group to drive the motor.

10 Claims, 8 Drawing Sheets

DRIVING CIRCUIT FOR SINGLE PHASE MOTOR AND DRIVING METHOD FOR THE SAME

CROSS-REFERENCE TO RELATED PATENT APPLICATION

This application claims the benefit of priority to Taiwan Patent Application No. 109135836, filed on Oct. 16, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a motor driving circuit for a single phase motor and a motor driving method for the same, and more particularly to a motor driving circuit for a single phase motor and a motor driving method for the same that are capable of improving efficiency and reducing power consumption.

BACKGROUND OF THE DISCLOSURE

A motor driver is a necessary modern industrial power conversion device, which is capable of converting electricity into kinetic energy. Conventional motors include DC motors, AC motors, stepping motors, and the like. The DC motors and AC motors are often applied in an electronic device that does not require precise control to drive one element of the electronic device, for example, blades of an electronic fan device are usually rotated with the use of the motors. Therefore, how an efficient motor can be designed has become a major objective in the industry.

SUMMARY OF THE DISCLOSURE

In response to the above-referenced technical inadequacies, the present disclosure provides a motor driving circuit for a single phase motor and a motor driving method for the same that are capable of improving efficiency and reducing power consumption.

In one aspect, the present disclosure provides a motor driving circuit for driving a single phase motor, the motor driving circuit includes a motor driver, a Hall sensor, a Hall commutation detection circuit, a period recording circuit, a motor current detection circuit, a cut-off angle adjustment circuit, an angle calculation circuit and a control circuit. The motor driver is connected to the single phase motor and includes a plurality of switches. The Hall sensor is configured to sense a magnitude of a magnetic field of a rotor of the single phase motor, and correspondingly generate a Hall signal group. The Hall commutation detection circuit is configured to detect positive and negative polarities of the magnetic field according to the Hall signal group, and correspondingly generate a Hall commutation signal for indicating a commutation point. The period recording circuit is configured to record the Hall commutation signal to generate a period indicator signal. The motor current detection circuit is configured to detect a motor current value when the single phase motor passes the commutation point after the single phase motor operates normally. The cut-off angle adjustment circuit is configured to generate a cut-off angle adjustment signal indicating a cut-off adjustment angle according to the motor current values when the single phase motor passes the commutation point. The angle calculation circuit is configured to receive the period indicator signal and the cut-off angle adjustment signal to generate a commutation signal according to the period of the period indicator signal, and to generate a cut-off signal according to the cut-off adjustment angle. The control circuit is configured to process the commutation signal and the cut-off signal to generate a control signal group to control the plurality of switches of the motor driver, and then the motor driver generates an output signal group to drive the single phase motor.

In some embodiments, the output signal group includes a first output signal and a second output signal, the first output signal is switched from a first level to a second level at a first switching point corresponding to the commutation point, and the second output signal is switched from the second level to the first level in advance at the cut-off adjustment angle before the first switching point.

In some embodiments, the cut-off angle adjustment circuit is further configured to determine whether or not the motor current value is zero when the single phase motor passes the commutation point, and in response to the motor current value being not zero when the single phase motor passes the commutation point, the cut-off angle adjustment circuit is configured to further determine whether or not the motor current value is greater than zero or less than zero. In response to the motor current value being greater than zero, the cut-off angle adjustment circuit is configured to increase the cut-off adjustment angle, and in response to the motor current value being less than zero, the cut-off angle adjustment circuit is configured to decrease the cut-off adjustment angle.

In some embodiments, the angle calculation circuit further receives an advance angle signal defining an advance angle value, and is configured to generate the commutation signal according to the advance angle value, the cut-off adjustment angle, and the period indicated by the period indicator signal.

In some embodiments, the motor driver includes an input terminal receiving an input voltage, a first output terminal, a second output terminal, a first switch coupled between the input terminal and the first output terminal, a second switch coupled between the first output terminal and a ground terminal, a third switch coupled between the input terminal and the second output terminal, and a fourth switch coupled between the second output terminal and the ground terminal. The control signal group includes a first control signal, a second control signal, a third control signal, and a fourth control signal for controlling the first switch, the second switch, the third switch, and the fourth switch, respectively, such that the first output terminal and the second output terminal output the first output signal and the second control signal, respectively.

In another aspect, the present disclosure provides a motor driving method for driving a single phase motor, the motor driving method includes: a motor driver connected to the single phase motor and including a plurality of switches; configuring a Hall sensor to sense magnitude of a magnetic field of a rotor of the single phase motor, and correspondingly generate a Hall signal group; configuring a Hall commutation detection circuit to detect positive and negative polarities of the magnetic field according to the Hall signal group, and correspondingly generate a Hall commutation signal for indicating a commutation point; configuring a period recording circuit to record the Hall commutation signal to generate a period indicator signal; configuring a motor current detection circuit to detect a motor current value when the single phase motor passes the commutation point after the single phase motor operates normally; configuring a cut-off angle adjustment circuit to generate a cut-off angle adjustment signal indicating a cut-off adjustment angle according to the motor current values when the single phase motor passes the commutation point; configuring an angle calculation circuit to receive the period indicator signal and the cut-off angle adjustment signal to generate a commutation signal according to the period of the period indicator signal, and to generate a cut-off signal according to the cut-off adjustment angle; and configuring a control circuit to process the commutation signal and the cut-off signal to generate a control signal group to control the plurality of switches of the motor driver, and then the motor driver generates an output signal group to drive the single phase motor.

Therefore, the motor driving circuit for the single phase motor and the driving method for the same provided by the present disclosure can adaptively adjust the cut-off adjustment angle of the output signal by detecting the motor current at the commutation point, such that the motor current at the commutation point is close to a current zero point to achieve a best efficiency point and avoid reverse current generation, which can further improve efficiency and reduce power consumption.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
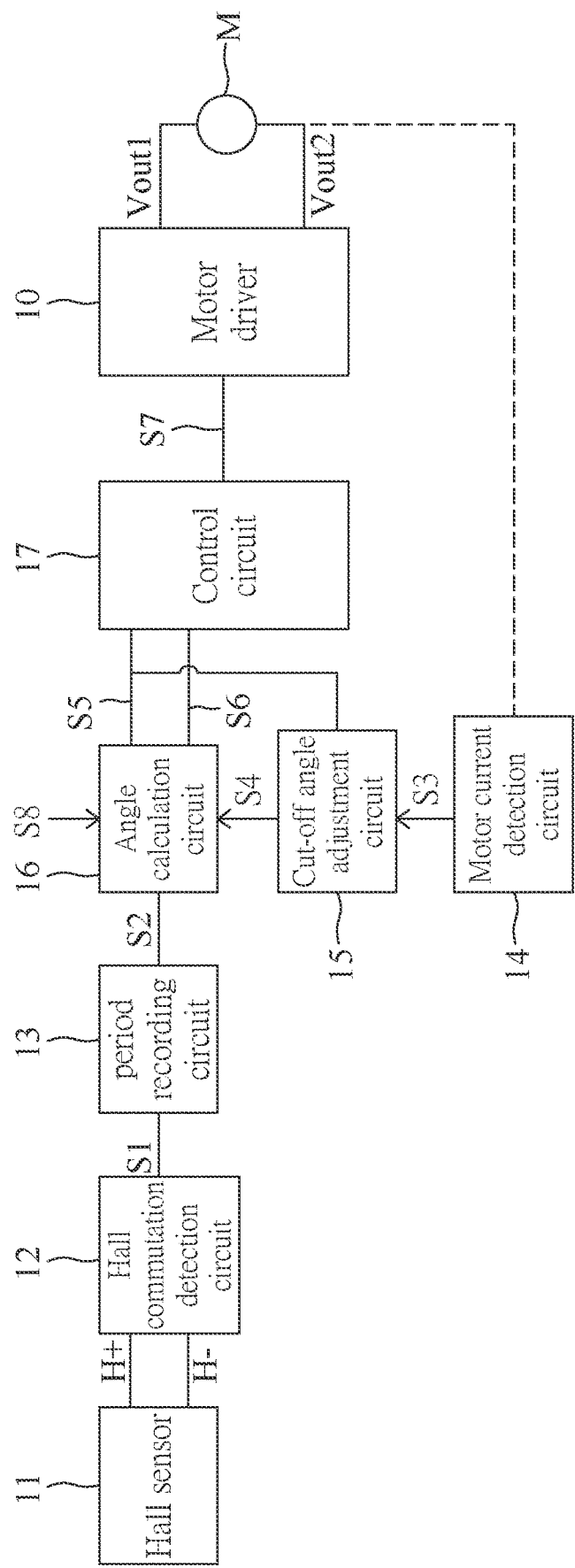
FIG. 1 is a functional block diagram of a motor driving circuit for a single phase motor according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

FIG. 1 is a functional block diagram of a motor driving circuit for a single phase motor according to an embodiment of the present disclosure. Reference is made to FIG. 1, an embodiment of the present disclosure provides a motor driving circuit 1 for driving a single phase motor M. The motor driving circuit 1 includes a motor driver 10, a Hall sensor 11, a Hall commutation detection circuit 12, a period recording circuit 13, a motor current detection circuit 14, a cut-off angle adjustment circuit 15, an angle calculation circuit 16, and a control circuit 17.

Figure 2:
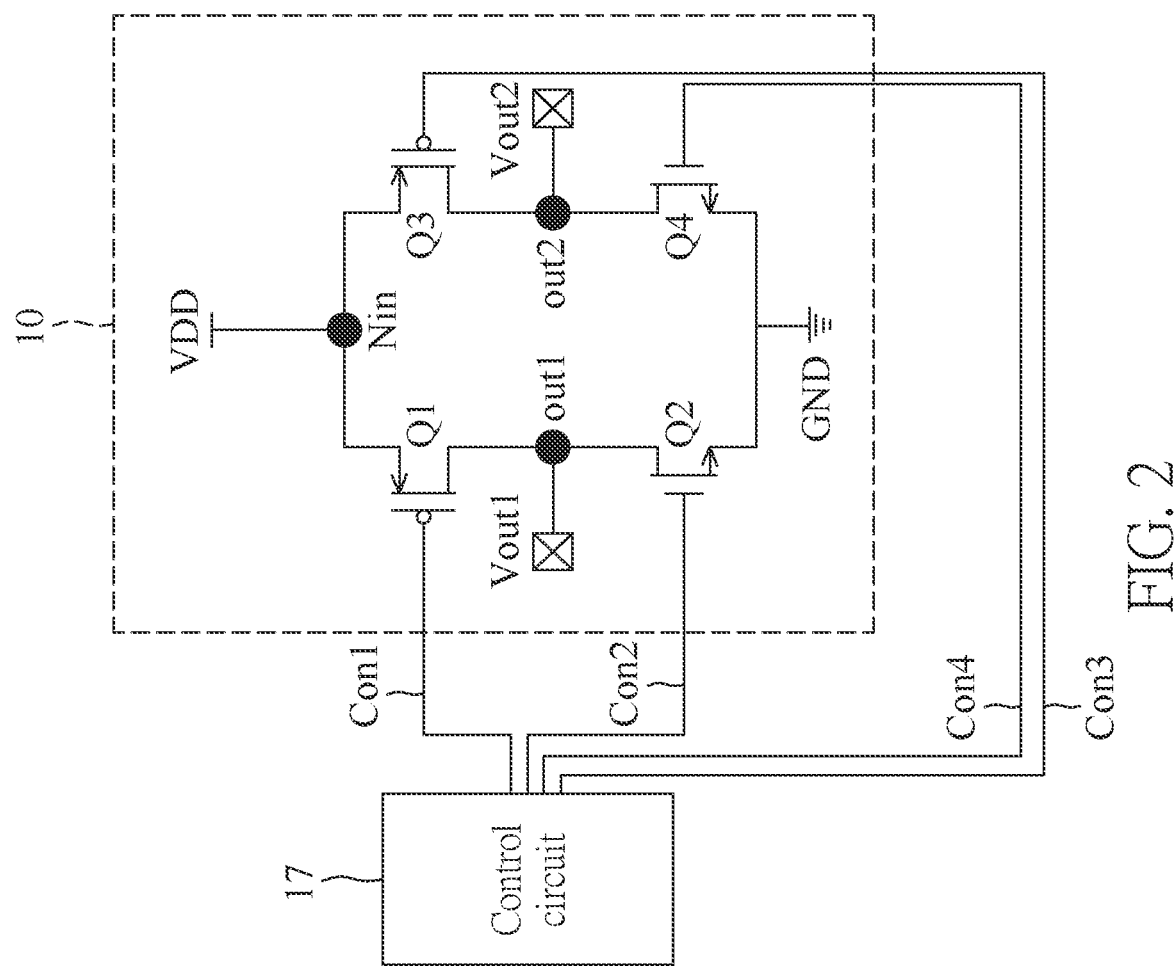
FIG. 2 is a circuit layout of a motor driver according to the embodiment of the present disclosure.

The motor driver 10 is connected to the single phase motor M and includes a plurality of switches. Reference is further made to FIG. 2, which is a circuit layout of a motor driver according to the embodiment of the present disclosure. As shown in FIG. 2, the motor driver includes an input terminal Nin receiving an input voltage VDD, a first output terminal Out1, a second output terminal Out2, a first switch Q1, a second switch Q2, a third switch Q3, and a fourth switch Q4. The first switch Q1 is coupled between the input terminal Nin and the first output terminal Out1. The second switch Q2 is coupled between the first output terminal Out1 and a ground terminal GND. The third switch Q3 is coupled between the input terminal Nin and the second output terminal Out2. The fourth switch Q4 is coupled between the second output terminal Out2 and the ground terminal GND.

The first switch Q1, the second switch Q2, the third switch Q3, and the fourth switch Q4 are controlled by a first control signal Con1, a second control signal Con2, a third control signal Con3, and a fourth control signal Con4, respectively, such that the first output terminal Out1 and the second output terminal Out2 respectively output a first output signal Vout1 and a second output signal Vout2. The first switch Q1, the second switch Q2, the third switch Q3, and the fourth switch Q4 can be a P-type metal oxide semiconductor field effect transistor (P-MOSFET) or a N-type metal oxide semiconductor field effect transistor (N-MOSFET). Taking the first switch Q1 and the third switch Q3 as two P-MOSFETs for an example, and taking the second switch Q2 and the fourth switch Q4 as two N-MOSFETs for an example.

The Hall sensor 11 is configured to sense magnitude of a magnetic field of a rotor of the single phase motor M, and correspondingly generate a Hall signal group (including Hall signals H+ and H−) according to operating characteristics of the single phase motor M. The Hall commutation detection circuit 12 is configured to detect positive and negative polarities of the magnetic field according to the Hall signal group (including Hall signals H+ and H−), and correspondingly generate a Hall commutation signal S1 for indicating a commutation point Ps.

Figure 3:
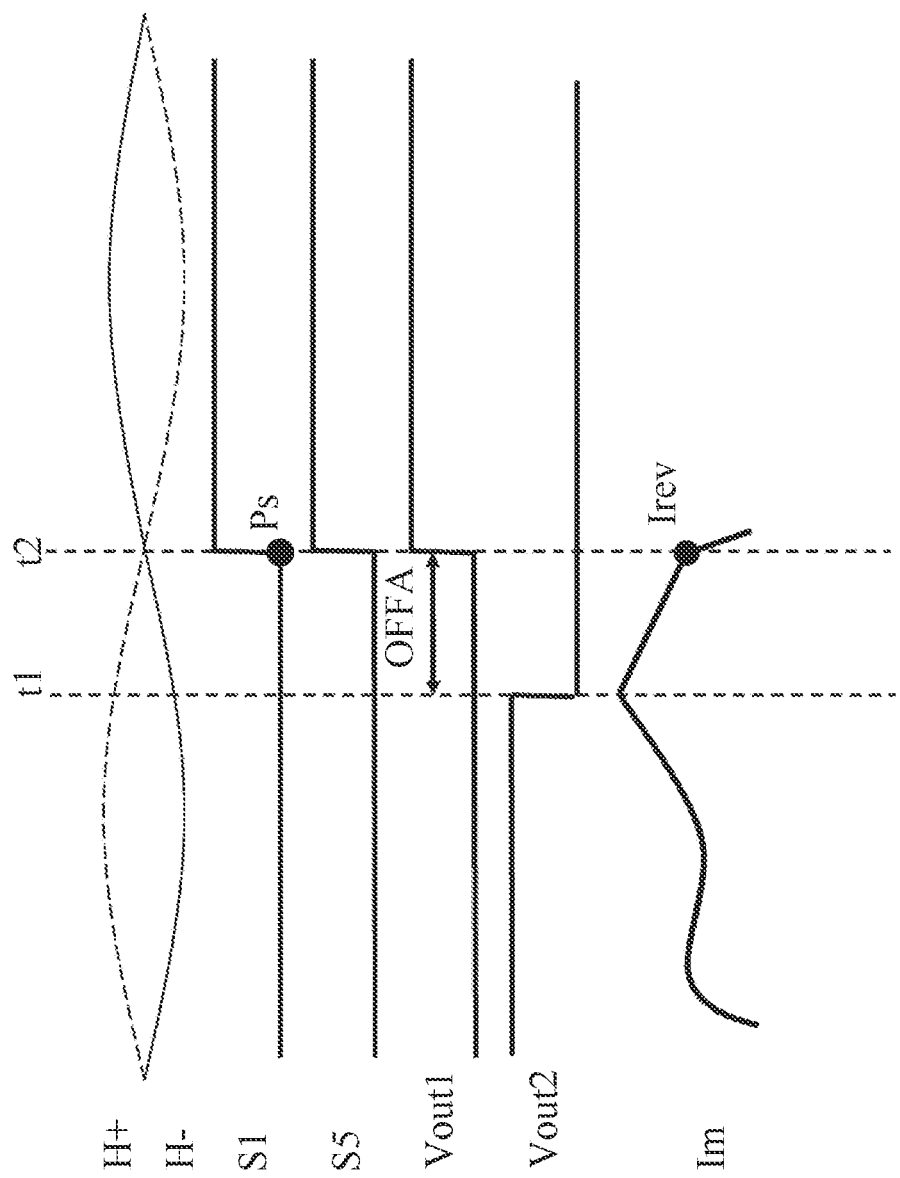
FIG. 3 is a signal timing diagram of the motor driving circuit according to the embodiment of the present disclosure.

For example, further reference may be made to FIG. 3, which is a signal timing diagram of the motor driving circuit according to the embodiment of the present disclosure. As shown in FIG. 3, the Hall commutation detection circuit 12 can determine the commutation point Ps according to the Hall signals H+ and H− to correspondingly generate the Hall commutation signal S1.

Furthermore, the period recording circuit 13 is configured to record the Hall commutation signal S1 to generate a period indicating signal S2. The motor current detection circuit 14 can be used to detect a motor current value Im when the single phase motor M passes the commutation point after the single phase motor M operates normally, and correspondingly generate the motor current detection signal S3.

Under normal operation of the single phase motor M, when the control circuit 17 controls the motor driver 10 to generate an output signal group (including the first output signal Vout1 and the second output signal Vout2), the first output signal Vout1 and the second output signal Vout2 can be switched at different time points based on a cut-off adjustment angle OFFA. For example, a control signal group S7 generated by the control circuit 17 can make the second output signal Vout2 advance the cut-off adjustment angle OFFA to be switched from a high level to a low level at time t1, and the first output signal Vout1 is switched from a low level to a high level at the commutation point Ps (time t2). Under conventional conditions, the cut-off adjustment angle OFFA is preset and cannot be adjusted according to the operating environment of the single phase motor M. Therefore, there is still a reverse current Irev at the commutation point Ps and the best efficiency point cannot be reached.

In order to achieve the best efficiency point (that is, the motor current value Im at the commutation point Ps needs to be zero), the present disclosure utilizes the motor current detection circuit 14 to detect the motor current value Im when the single phase motor M passes through the commutation point. The cut-off angle adjustment circuit 15 further generates a cut-off angle adjustment signal S4 indicating the cut-off adjustment angle OFFA according to the motor current value Im during the commutation.

Figure 4:
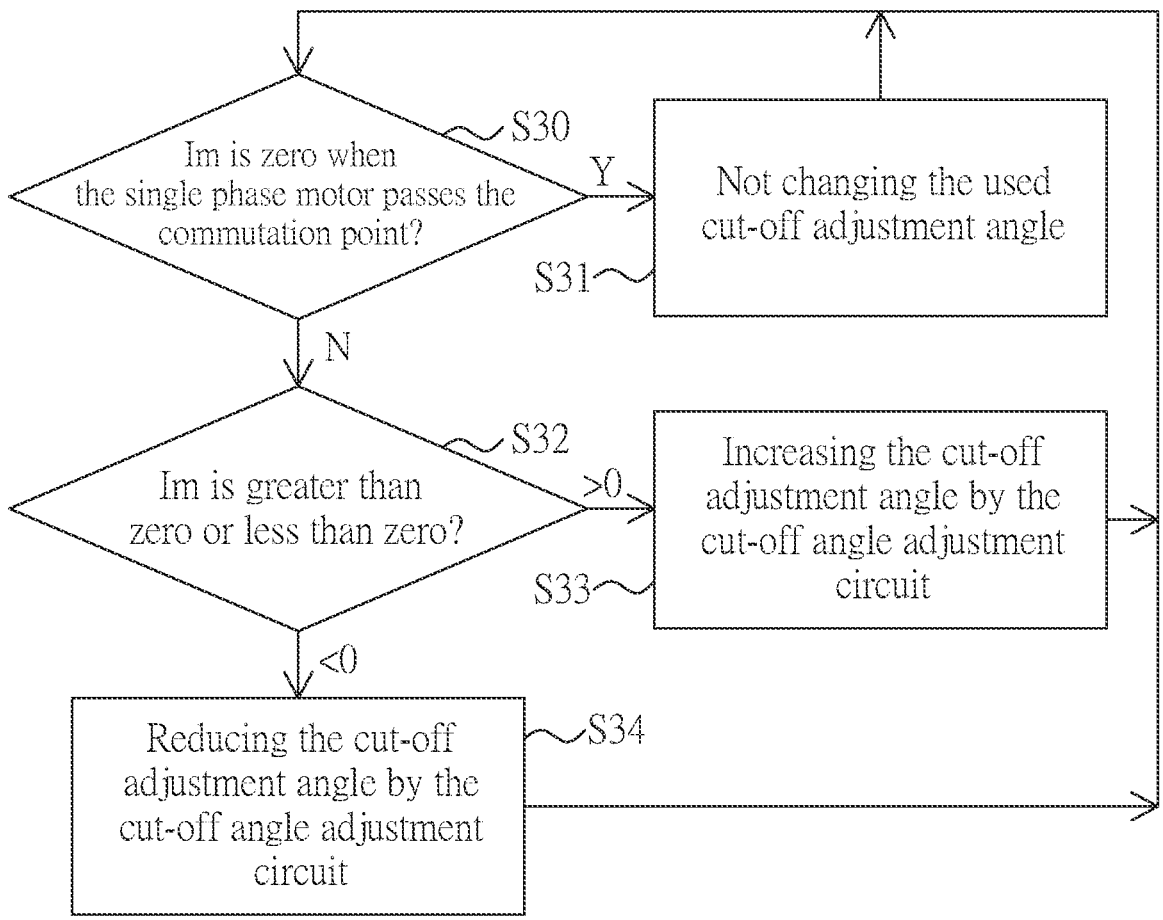
FIG. 4 is a flow chart of an operation of a cut-off angle adjustment circuit according to the embodiment of the present disclosure.

Reference is further made to FIG. 4, which is a flow chart of an operation of the cut-off angle adjustment circuit according to the embodiment of the present disclosure. In further detail, the cut-off angle adjustment circuit 15 can determine the motor current value Im according to the following process after the single phase motor M operates normally and generates the corresponding cut-off adjustment angle OFFA:

Step S30: determining whether or not the motor current value Im is zero when the single phase motor M passes the commutation point.

In response to determining that the motor current value Im is zero, the operation proceeds to step S31: not changing the used cut-off adjustment angle OFFA, and the operation returns to step S30 to continuously detect and determine whether or not the motor current value Im is zero.

In response to determining that the motor current value Im is not zero, the operation proceeds to step S32: determining whether the motor current value Im is greater than zero or less than zero.

In response to the motor current value Im being greater than zero, the operation proceeds to step S33: increasing the cut-off adjustment angle OFFA by the cut-off angle adjustment circuit 15. For example, the cut-off adjustment angle OFFA is increased by 1 degree until the single phase motor M commutes again, and it is confirmed again whether or not the increased cut-off adjustment angle OFFA can enable the single phase motor M to operate at the best efficiency point.

The angle calculation circuit 16 is configured to receive the period indication signal S2 and the cut-off angle adjustment signal S3 to generate a commutation signal S5 according to a period indicated by the period indication signal S2, and to generate a cut-off signal S6 according to the cut-off adjustment angle OFFA.

The control circuit 17 is configured to process the commutation signal S5 and the cut-off signal S6 to generate a control signal group S7 to control the first switch Q1, the second switch Q2, the third switch Q3, and the fourth switch Q4 of the motor driver 10, and then the motor driver 10 generates the output signal group (including the first output signal Vout1 and the second output signal Vout2) to drive the single phase motor M.

Figure 5:
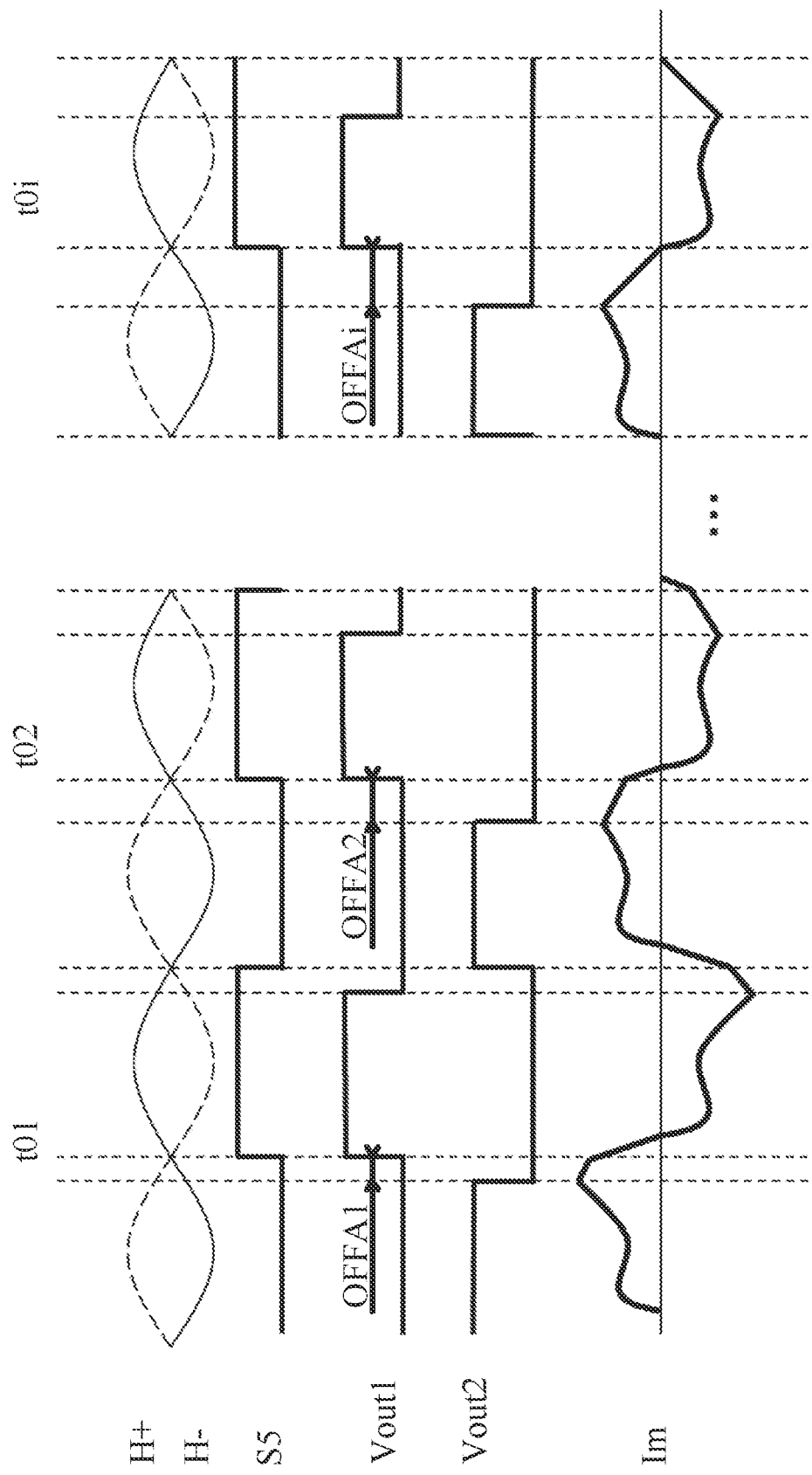
FIG. 5 is a first schematic diagram showing the cut-off angle adjustment circuit adjusting an output signal group based on a motor current value according to the embodiment of the present disclosure.

Reference is further made to FIG. 5, which is a first schematic diagram showing that the cut-off angle adjustment circuit adjusts an output signal group according to the motor current value according to the embodiment of the present disclosure. As shown in FIG. 5, at time t01, a preset cut-off adjustment angle OFFA1 is used, such that the motor current value Im is greater than zero at the commutation point corresponding to time t0l. Therefore, the cut-off angle adjustment circuit 15 increases the cut-off adjustment angle OFFA1 to generate the cut-off adjustment angle OFFA2, and further determines the motor current value Im of the single phase motor M at the commutation point corresponding to time t02. It can be seen from FIG. 5, that at time t02, the motor current value Im is still greater than 0, so the cut-off adjustment angle OFFA2 is continuously adjusted. Until time t0i, the cut-off adjustment angle OFFAi is used, and the motor current value Im is equal to 0, reaching the best efficiency point.

In response to the motor current value Im being less than zero, the operation proceeds to step S34: reducing the cut-off adjustment angle OFFA by the cut-off angle adjustment circuit 15. For example, the cut-off adjustment angle OFFA is reduced by 1 degree until the single phase motor M commutes again, and it can be confirmed again whether the increased cut-off adjustment angle OFFA can enable the single phase motor M to operate at the best efficiency point.

Figure 6:
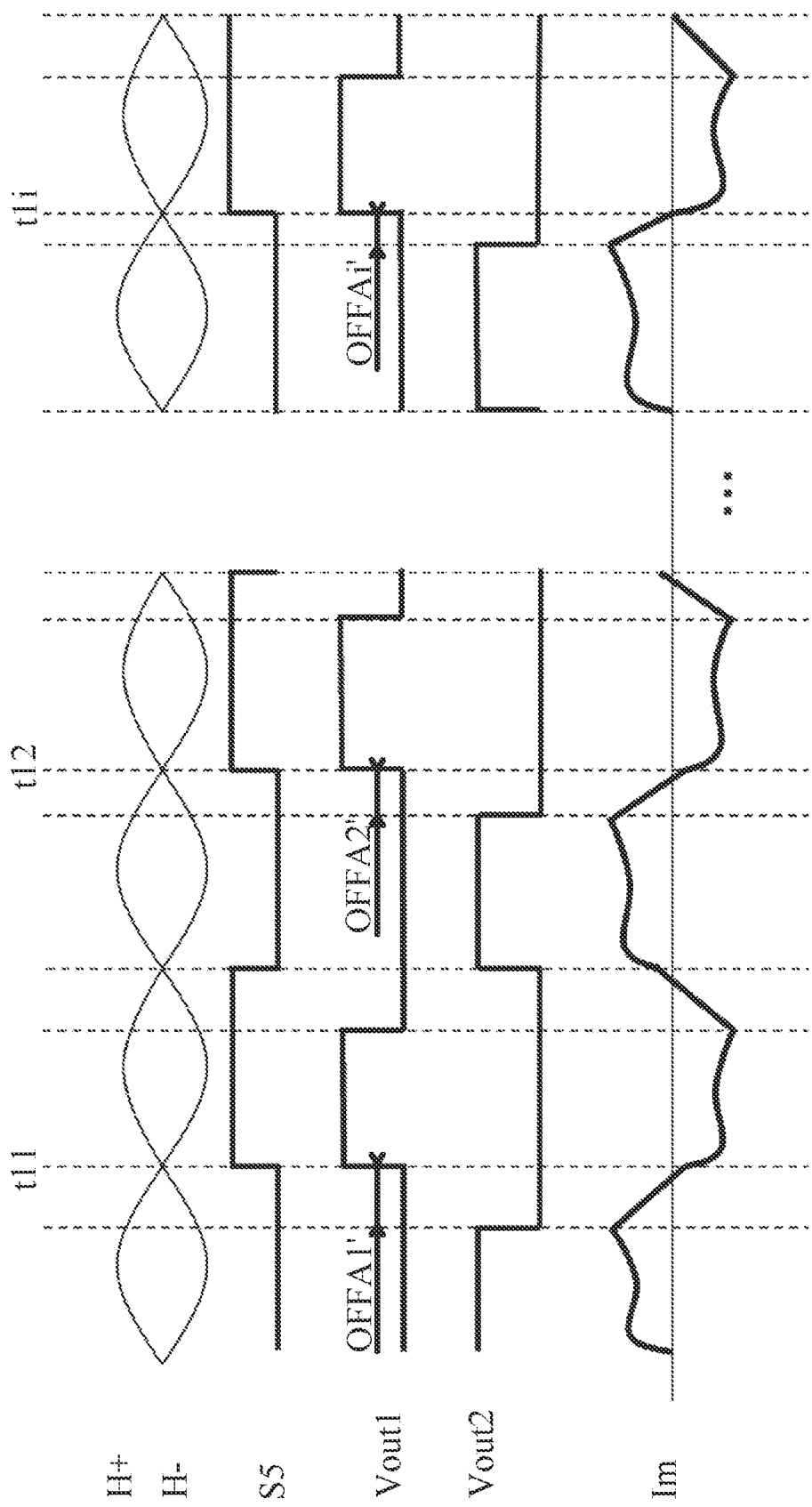
FIG. 6 is a second schematic diagram showing the cut-off angle adjustment circuit adjusting the output signal group based on the motor current value according to the embodiment of the present disclosure.

Reference can be made to FIG. 6, which is a second schematic diagram showing the cut-off angle adjustment circuit adjusting the output signal group based on the motor current value according to the embodiment of the present disclosure. As shown in FIG. 6, at time t11, a preset cutoff adjustment angle OFFA1' is used, such that the motor current value Im is less than 0 at the commutation point corresponding to time tn. Therefore, the cut-off angle adjustment circuit 15 decreases the cut-off adjustment angle OFFA1' to generate the cut-off adjustment angle OFFA2', and further determines the motor current value Im of the single phase motor M at the commutation point corresponding to time t12. It can be seen from FIG. 6 that at time t12, the motor current value Im is still less than 0, so that the cut-off adjustment angle OFFA2' is continuously adjusted. Until time t1$i$, the cut-off adjustment angle OFFA$i$' is used, and the motor current value Im is equal to 0, reaching the best efficiency point.

In some embodiments, the angle calculation circuit 16 further receives an advance angle signal S8 defining an advance angle value LA, and is configured to generate the commutation signal S5 according to the advance angle value LA, the cut-off adjustment angle OFFA, and the period indicated by the period indicator signal S2.

Figure 7:
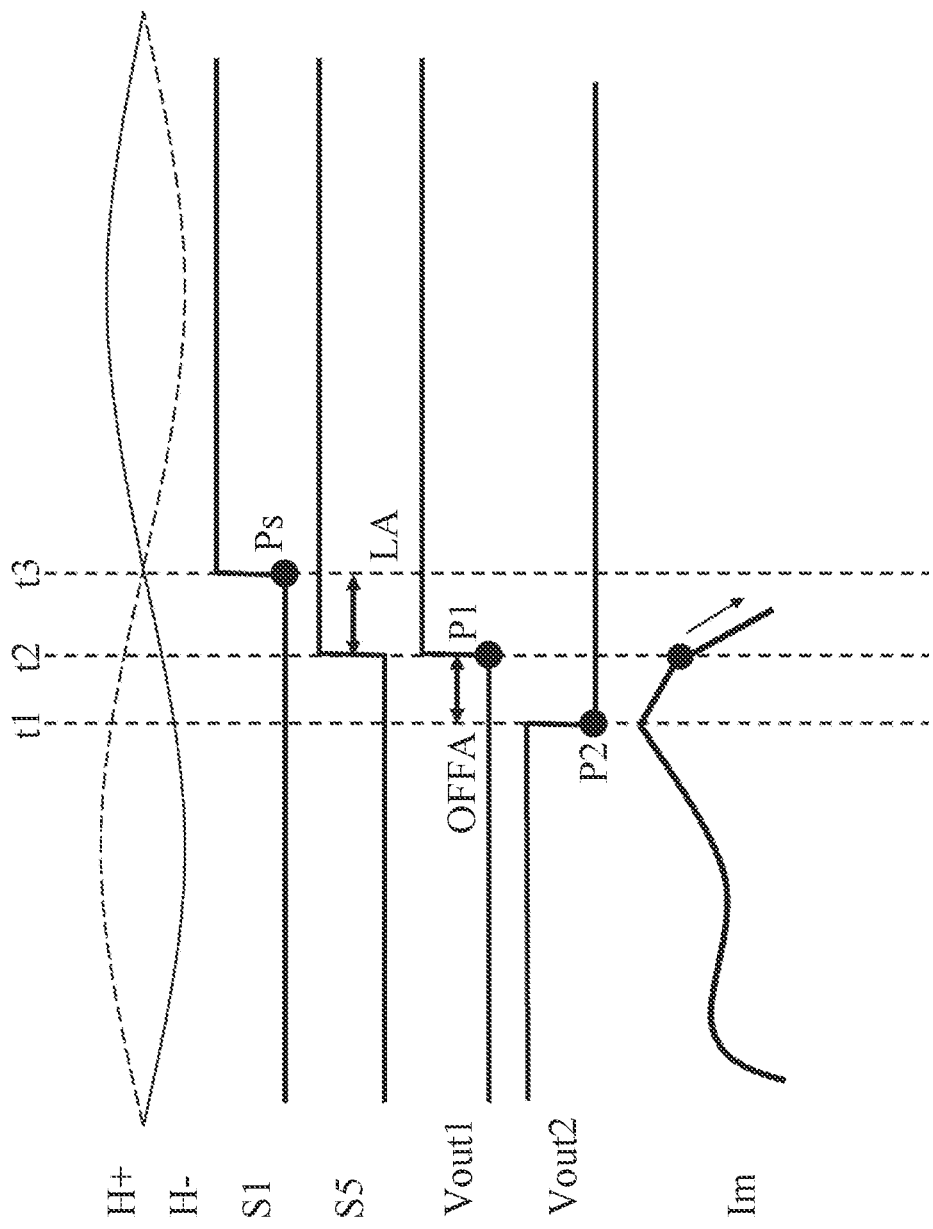
FIG. 7 is another signal timing diagram of the motor driving circuit according to the embodiment of the present disclosure.

Reference can be made to FIG. 7, which is another signal timing diagram of the motor driving circuit according to the embodiment of the present disclosure. As shown in FIG. 7, after the advance angle value LA is added, the commutation signal S5 further advances the first output signal Vout1 by an advance angle value LA to be switched from a first level to a second level (switched from a low level to a high level) at the first switching point P1 before the commutation point Ps, and the second output signal Vout2 is switched from the second level to the first level (switched from the high level to the low level) in advance at the cut-off adjustment angle OFFA before the first switching point P1 (that is, at the second switching point P2).

In other words, the angle calculation circuit S8 can comprehensively generate the commutation signal S5 and the cut-off signal S6 based on the period indication signal S2, the cut-off angle adjustment signal S3, and the advance angle signal S4, such that the control circuit 17 correspondingly controls the motor driver 10 according to the process similar to that depicted in the aforementioned FIGS. 4 to 6.

Therefore, the motor driving circuit for the single phase motor provided by the present disclosure can adaptively adjust the cut-off adjustment angle of the output signal by detecting the motor current at the commutation point, such that the motor current at the commutation point is close to a current zero point to achieve a best efficiency point and avoid reverse current generation, which can further improve efficiency and reduce power consumption.

Figure 8:
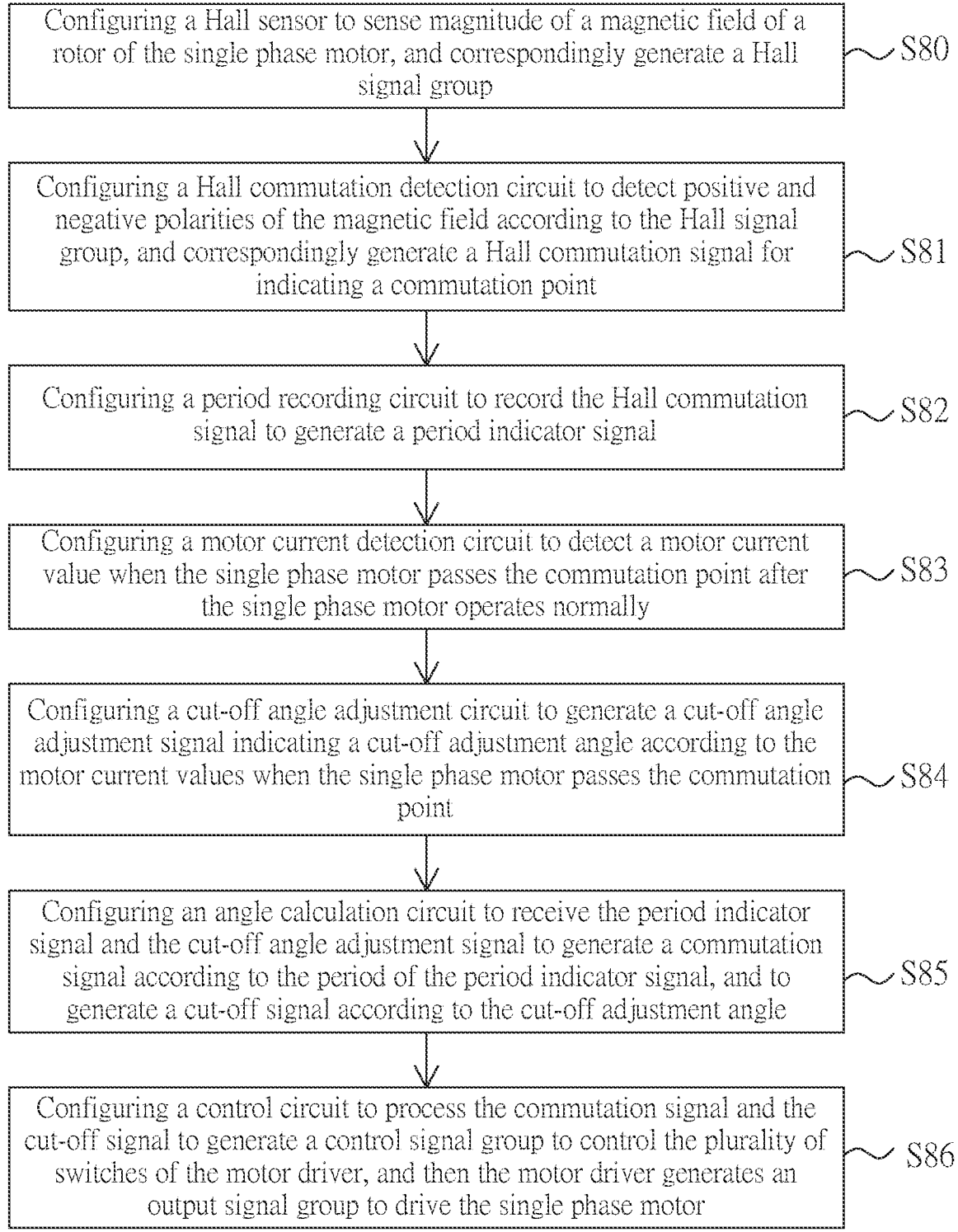
FIG. 8 is a flowchart of a motor driving method according to an embodiment of the present disclosure.

Reference is further made to FIG. 8, which is a flowchart of a motor driving method according to an embodiment of the present disclosure. As shown in FIG. 8, the present disclosure further provides a motor driving method for a single phase motor, the motor driving method is suitable for the motor driving circuit 1 shown in FIG. 1, but the present disclosure is not limited thereto. The motor driving method includes:

Step S80: configuring a Hall sensor to sense magnitude of a magnetic field of a rotor of the single phase motor, and correspondingly generate a Hall signal group.

Step S81: configuring a Hall commutation detection circuit to detect positive and negative polarities of the magnetic field according to the Hall signal group, and correspondingly generate a Hall commutation signal for indicating a commutation point.

Step S82: configuring a period recording circuit to record the Hall commutation signal to generate a period indicator signal.

Step S83: configuring a motor current detection circuit to detect a motor current value when the single phase motor passes the commutation point after the single phase motor operates normally.

Step S84: configuring a cut-off angle adjustment circuit to generate a cut-off angle adjustment signal indicating a cut-off adjustment angle according to the motor current values when the single phase motor passes the commutation point.

Step S85: configuring an angle calculation circuit to receive the period indicator signal and the cut-off angle adjustment signal to generate a commutation signal according to the period of the period indicator signal, and to generate a cut-off signal according to the cut-off adjustment angle.

Step S86: configuring a control circuit to process the commutation signal and the cut-off signal to generate a control signal group to control the plurality of switches of the motor driver, and then the motor driver generates an output signal group to drive the single phase motor.

In conclusion, the motor driving circuit for the single phase motor and the driving method for the same provided by the present disclosure can adaptively adjust the cut-off adjustment angle of the output signal by detecting the motor current at the commutation point, such that the motor current at the commutation point is close to a current zero point to achieve a best efficiency point and avoid reverse current generation, which can further improve efficiency and reduce power consumption.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driving circuit for driving a single phase motor, which includes:
   a motor driver connected to the single phase motor and including a plurality of switches;
   a Hall sensor configured to sense a magnitude of a magnetic field of a rotor of the single phase motor, and correspondingly generate a Hall signal group;
   a Hall commutation detection circuit configured to detect positive and negative polarities of the magnetic field according to the Hall signal group, and correspondingly generate a Hall commutation signal to indicate a commutation point;
   a period recording circuit, configured to record the Hall commutation signal to generate a period indicator signal;
   a motor current detection circuit configured to detect a motor current value when the single phase motor passes the commutation point after the single phase motor operates normally;
   a cut-off angle adjustment circuit configured to generate a cut-off angle adjustment signal indicating a cut-off adjustment angle according to the motor current value when the single phase motor passes the commutation point;

an angle calculation circuit configured to receive the period indicator signal and the cut-off angle adjustment signal to generate a commutation signal according to a period of the period indicator signal, and to generate a cut-off signal according to the cut-off adjustment angle; and a control circuit configured to process the commutation signal and the cut-off signal to generate a control signal group to control the plurality of switches of the motor driver, the motor driver then generating an output signal group to drive the single phase motor.

2. The motor driving circuit according to claim 1, wherein the output signal group includes a first output signal and a second output signal, the first output signal is switched from a first level to a second level at a first switching point corresponding to the commutation point, and the second output signal is switched from the second level to the first level in advance at the cut-off adjustment angle before the first switching point.

3. The motor driving circuit according to claim 2, wherein the cut-off angle adjustment circuit is further configured to determine whether or not the motor current value is zero when the single phase motor passes the commutation point, and in response to the motor current value not being zero when the single phase motor passes the commutation point, the cut-off angle adjustment circuit is configured to further determine whether or not the motor current value is greater than zero or less than zero, wherein in response to the motor current value being greater than zero, the cut-off angle adjustment circuit is configured to increase the cut-off adjustment angle, and in response to the motor current value being less than zero, the cut-off angle adjustment circuit is configured to decrease the cut-off adjustment angle.

4. The motor driving circuit according to claim 2, wherein the angle calculation circuit further receives an advance angle signal defining an advance angle value, and is configured to generate the commutation signal according to the advance angle value, the cut-off adjustment angle, and the period indicated by the period indicator signal.

5. The motor driving circuit according to claim 1, wherein the motor driver includes:

an input terminal receiving an input voltage;
a first output terminal;
a second output terminal;
a first switch coupled between the input terminal and the first output terminal;
a second switch coupled between the first output terminal and a ground terminal;
a third switch coupled between the input terminal and the second output terminal; and
a fourth switch coupled between the second output terminal and the ground terminal,
wherein the control signal group includes a first control signal, a second control signal, a third control signal, and a fourth control signal for controlling the first switch, the second switch, the third switch, and the fourth switch, respectively, such that the first output terminal and the second output terminal output the first output signal and the second control signal, respectively.

6. A motor driving method for driving a single phase motor, the motor driving method comprising:

configuring a motor driver including a plurality of switches to be connected to the single phase motor;
configuring a Hall sensor to sense a magnitude of a magnetic field of a rotor of the single phase motor, and correspondingly generate a Hall signal group;
configuring a Hall commutation detection circuit to detect positive and negative polarities of the magnetic field according to the Hall signal group, and correspondingly generate a Hall commutation signal to indicate a commutation point;
configuring a period recording circuit to record the Hall commutation signal to generate a period indicator signal;
configuring a motor current detection circuit to detect a motor current value when the single phase motor passes the commutation point after the single phase motor operates normally;
configuring a cut-off angle adjustment circuit to generate a cut-off angle adjustment signal indicating a cut-off adjustment angle according to the motor current value when the single phase motor passes the commutation point;
configuring an angle calculation circuit to receive the period indicator signal and the cut-off angle adjustment signal to generate a commutation signal according to a period of the period indicator signal, and to generate a cut-off signal according to the cut-off adjustment angle; and
configuring a control circuit to process the commutation signal and the cut-off signal to generate a control signal group to control the plurality of switches of the motor driver, and then the motor driver generates an output signal group to drive the single phase motor.

7. The motor driving method according to claim 6, wherein the output signal group includes a first output signal and a second output signal, the first output signal is switched from a first level to a second level at a first switching point corresponding to the commutation point, and the second output signal is switched from the second level to the first level in advance at the cut-off adjustment angle before the first switching point.

8. The motor driving method according to claim 7, further comprising configuring the cut-off angle adjustment circuit to determine whether or not the motor current value is zero when the single phase motor passes the commutation point; in response to the motor current value not being zero when the single phase motor passes the commutation point, configuring the cut-off angle adjustment circuit to further determine whether or not the motor current value is greater than zero or less than zero;

wherein in response to the motor current value being greater than zero, configuring the cut-off angle adjustment circuit to increase the cut-off adjustment angle; and in response to the motor current value being less than zero, configuring the cut-off angle adjustment circuit to decrease the cut-off adjustment angle.

9. The motor driving method according to claim 7, further comprising:

configuring the angle calculation circuit to receive an advance angle signal defining an advance angle value; and
configuring the angle calculation circuit to generate the commutation signal according to the advance angle value, the cut-off adjustment angle, and the period indicated by the period indicator signal.

10. The motor driving method according to claim 6, wherein the motor driver includes:

an input terminal receiving an input voltage;
a first output terminal;
a second output terminal;
a first switch coupled between the input terminal and the first output terminal;
a second switch coupled between the first output terminal and a ground terminal;
a third switch coupled between the input terminal and the second output terminal; and
a fourth switch coupled between the second output terminal and the ground terminal,
wherein the control signal group includes a first control signal, a second control signal, a third control signal, and a fourth control signal for controlling the first switch, the second switch, the third switch, and the fourth switch, respectively, such that the first output terminal and the second output terminal output the first output signal and the second control signal, respectively.

* * * * *